US008145579B2

(12) United States Patent
Iqbal

(10) Patent No.: US 8,145,579 B2
(45) Date of Patent: Mar. 27, 2012

(54) SYSTEM, METHOD AND PROGRAM PRODUCT TO ESTIMATE COST OF INTEGRATING AND UTILIZING HETEROGENEOUS DATA SOURCES

(75) Inventor: Mickey Iqbal, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/873,903

(22) Filed: Sep. 1, 2010

(65) Prior Publication Data

US 2011/0040703 A1 Feb. 17, 2011

Related U.S. Application Data

(63) Continuation of application No. 11/130,737, filed on May 17, 2005, now abandoned.

(51) Int. Cl.
*G06F 17/00* (2006.01)
*G06G 7/00* (2006.01)

(52) U.S. Cl. ....................................... 705/400
(58) Field of Classification Search ........................ None
See application file for complete search history.

(56) References Cited

U.S. PATENT DOCUMENTS

| | | |
|---|---|---|
| 5,189,606 A | 2/1993 | Burns et al. |
| 5,249,120 A | 9/1993 | Foley |
| 5,291,397 A | 3/1994 | Powell |
| 5,497,486 A | 3/1996 | Stolfo et al. |
| 5,717,915 A | 2/1998 | Stolfo et al. |
| 5,765,140 A | 6/1998 | Knudson et al. |
| 5,806,066 A | 9/1998 | Golshani et al. |
| 5,848,394 A | 12/1998 | D'Arrigo et al. |
| 5,918,219 A | 6/1999 | Isherwood |
| 5,950,171 A | 9/1999 | Madell |
| 5,970,482 A | 10/1999 | Pham et al. |
| 6,012,054 A | 1/2000 | Seputis |
| 6,016,657 A | 1/2000 | Buschur |
| 6,072,479 A | 6/2000 | Ogawa |
| 6,169,983 B1 | 1/2001 | Chaudhuri et al. |

(Continued)

OTHER PUBLICATIONS

Ouksel, et al., "Ontologies are not the Panacea in Data Integration: A Flexible Coordinator to Mediate Context Construction", International Journal of Distributed and Parallel Databases, Kluwer Academic Publishers, Jan. 1999.

(Continued)

*Primary Examiner* — John Hayes
*Assistant Examiner* — George Chen
(74) *Attorney, Agent, or Firm* — Arthur J. Samodovitz

(57) ABSTRACT

System, method and program product for estimating a cost of reconciling heterogeneous data sources. A transition cost for integrating together a first program to identify semantic conflicts, a second program to classify semantic conflicts and a third program to reconcile semantic conflicts is estimated. A steady state cost for managing and maintaining the integrated first, second and third programs is estimated. Another system, method and program product for estimating a cost of integrating heterogeneous data sources. A steady state cost of managing and maintaining a first program which identifies semantic conflicts between a cross data source query and schema elements in a data source is estimated. A steady state cost of managing and maintaining a second program which classifies semantic conflicts between the cross data source query and schema elements in the data source is estimated. A steady state cost of managing and maintaining a third program which reconciles semantic conflicts between the cross data source query and schema elements in the data source is estimated.

15 Claims, 1 Drawing Sheet

U.S. PATENT DOCUMENTS

| | | |
|---|---|---|
| 6,219,930 B1 | 4/2001 | Reid |
| 6,263,345 B1 | 7/2001 | Farrar et al. |
| 6,330,552 B1 | 12/2001 | Farrar et al. |
| 6,353,826 B1 | 3/2002 | Seputis |
| 6,393,290 B1 | 5/2002 | Ufongene |
| 6,446,053 B1 | 9/2002 | Elliott |
| 6,477,518 B1 | 11/2002 | Li et al. |
| 7,225,137 B1 | 5/2007 | Barritz |
| 2003/0018573 A1 | 1/2003 | Comas et al. |
| 2003/0172368 A1* | 9/2003 | Alumbaugh et al. ......... 717/106 |
| 2004/0093344 A1 | 5/2004 | Berger et al. |
| 2005/0066263 A1 | 3/2005 | Baugher |
| 2006/0259442 A1 | 11/2006 | Iqbal |

OTHER PUBLICATIONS

Batini, C. et al. "A Comparative Analysis of Methodologies for Database Schema Integration," ACM Computing Surveys., 18(4), 1986.

Bright, M. W. et al., "Automated Resolution of Semantic Heterogeneity in Multidatabases," ACM Transactions on Database Systems 19(2): pp. 212-253, Jun. 1994.

J. DeKleer, "Problem Solving with the ATMS," Artificial Intelligence, 28, pp. 197-224, 1986.

Mena, E, et al., "Observer: An Approach for Query Processing in Global Information Systems Based on Interoperation Across Pre-existing Ontologies," In Proceedings of the First IFCIS International Conf. on Cooperative Information Systems (CoopIS '96), Brussels, Belgium, pp. 14-25, Jun. 1996.

Gruber, T. R., A Translation Approach to Portable Ontology Specifications, " Knowledge Acquisition," 5(2): pp. 199-220, 1993.

Goh, C. et al, "Context Interchange: Overcoming the Challenges of Large Scale Interoperable Database Systems in a Dynamic Environment, " In Proceedings of the 3rd International Conference on Knowledge Management, pp. 337-346. Maryland, 1994.

Kahng, J. et al., D. McLeod, "Dynamic Classificational Ontologies for Discovery in Cooperated Federated Databases" First IFCIS International Conference on Cooperative Information Systems (CoopIS '96), Brussels, Belgium, pp. 26-35, Jun. 1996.

Kashyap, V. et al., "Semantic and Schematic Similarities between Database Objects: A Context-Based Approach, " VLDB Journal, 5(4), Oct. 1996.

Litwin, W. et al., "Interoperability of Multiple Autonomous Databases, " ACM Computing Surveys., 22(3), 1990.

Mahesh, K. et al, "A Situated Ontology for Practical NLP," . In Proc. Workshop on BasicOntological Issues in Knowledge Sharing, International Joint Conference on Artificial Intelligence (IJCAI 95), Aug. 19 20, 1995. Montreal, Canada.

Mahesh, K. et al., "Meaning Representation for Knowledge Sharing in Practical Machine Translation," In Proc. FLAIRS 96 track on Information Interchange, Florida AI Research Symposium, May 1996.

Mikrokosmos: http://crl.nmsu.edu/Research/Projects/mikro/ontology/onto intro page.html, May 2008.

Milliner, S. et al., "A Scalable Architecture for Autonomous Heterogeneous Database Interactions, " In Proc. the 21st International Conference on Very Large Databases, VLDB '95 Proceedings, Zurich, Switzerland, Sep. 1995.

Naiman, C. et al., "A Classification of Semantic Conflicts in Heterogeneous Database Systems, " Journal of Organizational Computing. 5(2), pp. 167-193, 1995.

Ouksel, A. et al., "Coordinating Context Building in Heterogeneous Information Systems," Journal of Intelligent Information Systems 3(2), pp. 151-183, 1994.

Ouksel, A. et al., "Coordinating Knowledge Elicitation to Support Context Construction in Cooperative Information Systems," In Proc. First IFCIS International Conference on Cooperative Information Systems (CoopIS '96), Brussels, Belgium, pp. 4-13, Jun. 1996.

Ouksel, A, In-context peer-to-peer information filtering on the Web. SIGMOD Record 32(3): 65-70 (2003).

Sciore, E., Using Semantic Values to Facilitate Interoperability Among Heterogeneous Information Systems, ACM Transactions on Database Systems, 19(2), pp. 254-290, Jun. 1994.

G. Shafer, (1976). A Mathematical Theory of Evidence, Princeton University Press, Princeton N. J., pp. 41-45, 208-227, 258-297.

Sheth, A. et al., "Federated Database Systems for Managing Distributed, Heterogeneous, and Autonomous Database,"ACM Computing Surveys, 22(3), 1990.

Siegel, M. et al., "A Metadata Approach to Resolving Semantic Conflicts," In Proc. Seventh International Conference on Very Large Databases, pp. 133-145 Sep. 1991.

Yu, C. et al., "Determining Relationships Among Names in Heterogeneous Databases," SIGMOD Record 20(4): pp. 79-80, Dec. 1991.

Ouksel, A. et al. "Using SCOPES for Dynamic Construction of Context in Heterogeneous Information Systems". In Proc. AIS 1996 Americas Conference on Information Systems, Phoenix, Arizona, pp. 623-625 Aug. 1996.

Ouksel, A. et al., "Plausible Inference of Context in Heterogeneous Information Systems," in Proc. 5th International Workshop on Information Systems and Technology, Amsterdam, pp. 120-129, Dec, 1995.

Nikolov, Andriy et al., "Using the Dempster-Shafer theory of evidence to resolve ABox inconsistencies" in the Knowledge Media Institute, The Open University, Milton Keynes, UK, pp. 4-10 May 2008.

Lee, Chiang et al., "Query Optimization in Multidatabase Systems Considering Schema Conflicts," Knowledge and Data Engineering, IEEE Transactions, vol. 9 Issue 6, Nov.-Dec. 1997, pp. 941-955.

Non-final Office Action dated Apr. 15, 2008 for U.S. Appl. No. 11/130,737.

Final Office Action dated Sep. 2, 2008 for U.S. Appl. No. 11/130,737.

Non-final Office Action dated Mar. 20, 2009 for U.S. Appl. No. 11/130,737.

Non-final Office Action dated Mar. 4, 2010 for U.S. Appl. No. 11/130,737.

Ahmed, Iqbal; "An Approach for In-Context Semantic Reconciliation Among Web Enabled Information Sources", CISORS Lab Technical Report, Unviersitiy of Illinois, Chicago, Aug. 1999.

Dekleer, J; "An Assumption-Based Truth Maintenance System", Artificial Intelligence, 28, pp. 127-162, 1986.

* cited by examiner

SYSTEM, METHOD AND PROGRAM PRODUCT TO ESTIMATE COST OF INTEGRATING AND UTILIZING HETEROGENEOUS DATA SOURCES

CROSS REFERENCE TO RELATED APPLICATION

This is application is a Continuation application of U.S. patent application Ser. No. 11/130,737 filed May 17, 2005 now abandoned and now U.S. Published Patent Application No. 2006/0259442 A1.

BACKGROUND OF THE INVENTION

The invention relates generally to computer systems and services, and more particularly to a tool to estimate the cost of integrating heterogeneous data sources together so the data in these heterogeneous information sources can be exchanged between each other and accessed by users.

Organizations today often need to access multiple, heterogeneous data sources. Existing middleware technology and the World Wide Web enable physical connectivity between dispersed and heterogeneous data sources. "Heterogeneous" data sources are data repositories and data management systems that are incompatible. The incompatibility, also called "semantic conflict", includes differences in structural representations of data, differences in data models, mismatched domains, and different naming and formatting schemes employed by each data source. Thus, heterogeneous data sources store data in different forms, and require different formats and/or protocols to access their data and exchange data between themselves.

The following are known examples of heterogeneous data sources and their incompatibility or semantic conflicts. Example 1 is a partial schema of an Oracle™ database, and example 2 is a partial data base schema of a Microsoft™ application for a SQL Server based employee database. (The term "data base schema" refers to fields, attributes, tables and other categorizations of data in a database.)

Example 1

Oracle database form used for employment data of a university.
Data Model: Non-Normalized Relational Schema (partial):
Faculty (SS#, Name, Dept, Sal_Amt, Sal_Type, Affiliation, Sponsor, University . . . )
Faculty: Any tuple of the relation Faculty, identified by the key SS#
SS#: An identifier, the social security number of a faculty member
Name: An identifier, Name of a faculty member
Dept: The academic or nonacademic department to which a faculty member is affiliated
Sal_Amt: The amount of annual Salary paid to a Faculty member
Sal_Type: The type of salary such as Base Salary, Grant, and Honorarium
Affiliation: The affiliation of a faculty member, such as teaching, non-teaching, research University: The University where a Faculty member is employed

Example 2

Microsoft database form of a SQL Server database of employees of engineering related firms.
Data Model: Non-Normalized Relational Schema (partial):
Employee (ID, Name, Type, Employer, Dept, CompType, Comp, Affiliation . . . )
Employee: Any tuple of the relation Employee, identified by the key ID
ID: An identifier, the social security number of an Employee
Name: An identifier, Name of an employee
Type: An attribute describing the job category of an Employee, such as Executive, Middle Manager, Consultant from another firm, etc.
Employer: Name of the employer firm such as AT&T, Motorola, General Motors, etc.
Dept: Name of the department where an Employee works
CompType: The type of compensation given to an employee, such as Base Salary, Contract Amount
Comp: The amount of annual compensation for an employee
Affiliation: Name of the Consultant firm, such as a University Name, Andersen Consulting, . . .

There exist several semantic correspondences between the Oracle database format and the Microsoft database format, as follows. Class 'Faculty' in Oracle database and class 'Employee' in Microsoft database intersect. Instances of attribute 'SSW#' in Oracle database correspond to instances of attribute 'ID' in Microsoft database where the employees are consultants from the universities. Attributes 'Dept' in Oracle database and Microsoft database share some common domain values, as do 'Sal_Type' in Oracle database and 'Comp_Type' in Microsoft database, and 'Sal_Amt' in Oracle database and 'Comp' in Microsoft database. These three pairs may be considered either as synonyms or as homonyms depending on the nature of the query posed against these two databases. Attributes 'Affiliation' in Oracle database and Microsoft database are homonyms, as are attribute 'University' in Oracle database and attribute 'Employer' in Microsoft database, because their domains do not overlap. The fact that the domains do not overlap is coincidental, and therefore cannot be assumed to be true all the time. The two attributes could have overlapped in other database instances. Attribute 'University' in Oracle database and 'Affiliation' in Microsoft database may be considered as synonyms for the subset of class 'Employee' where 'Employee. Type=Consultant', and where the values in the domain of the attribute 'Affiliation' in Microsoft database correspond to the names of Chicago based Universities. To allow these different data sources to exchange data, the corresponding attributes need to be identified and reconciled, so the data for both corresponding attributes can be treated as data for the same attribute. Likewise, to permit a user to access data for corresponding attributes with a single query, the attribute specified in the single query needs to be reconciled to both of the corresponding attributes. Known semantic reconciliation techniques include those designed to identify and reconcile semantic incompatibilities and distinctions such as those illustrated by the examples above. The number of semantic conflicts increases as more data sources are included in a data integration effort.

The following describes known techniques for resolving semantic conflicts while integrating heterogeneous data sources together so their data can be exchanged between each other and accessed by users.

A research paper entitled "A Comparative Analysis of Methodologies for Database Schema Integration", by Batini, Lenzerini and Navath, published in ACM Computing Surveys 18(4), 1986 discloses standardization of data definitions and structures through the use of a common conceptual (or a global) schema across a collection of data sources. The global schema specifies field and record definitions, structures and rules for updating data values. Using various mappings and transformations, source data is converted into a semantically equivalent, compatible form. Rules for performing these mappings in heterogeneous data sources typically exist as a separate layer above the component databases.

A research paper entitled "Interoperability of Multiple Autonomous Databases" by Litwin, Mark and Roussoupoulos, ACM Computing Surveys 22(3), 1990 discloses a multi-database language approach or federated database approach which is an alternative to total integration. This approach provides relief from some of the problems of creating a global schema by proposing a multi-database language to facilitate semantic reconciliation. This language shifts most of the burden of data integration to the users. For example, the language provides users with easy access to schema contents, such as attribute and entity names, domain values etc. of all participating information sources in the network. It is the responsibility of the users to determine the semantics of the data items in each information source in the network.

An object of the present invention is to provide accurate cost estimates based on a wide variety of parameters, for reconciling heterogeneous data sources.

Another object of the present invention is to automate, in whole or in part, cost estimates based on a wide variety of parameters, for reconciling heterogeneous data sources.

SUMMARY OF THE INVENTION

The present invention resides in a system, method and program product for estimating a cost of reconciling heterogeneous data sources. A transition cost for integrating together a first program to identify semantic conflicts, a second program to classify semantic conflicts and a third program to reconcile semantic conflicts is estimated. A steady state cost for managing and maintaining the integrated first, second and third programs is estimated.

The present invention resides in another system, method and program product for estimating a cost of integrating heterogeneous data sources. A steady state cost of managing and maintaining a first program which identifies semantic conflicts between a cross data source query and schema elements in a data source is estimated. A steady state cost of managing and maintaining a second program which classifies semantic conflicts between the cross data source query and schema elements in the data source is estimated. A steady state cost of managing and maintaining a third program which reconciles semantic conflicts between the cross data source query and schema elements in the data source is estimated.

The present invention resides in another system, method and program product for estimating cost of integrating heterogeneous data sources. A transition cost of implementing a first program which identifies semantic conflicts between a cross data source query and schema elements in a data source is estimated. A transition cost of implementing a second program which classifies semantic conflicts between the cross data source query and schema elements in the data source is estimated. A transition cost of implementing a third program which reconciles semantic conflicts between the cross data source query and schema elements in the data source is estimated.

The present invention resides in another system, method and program product for estimating a cost of integrating heterogeneous data sources. An estimation is made of a percent of schema elements in the data sources where functional computation based on semantic mapping between schema terms and ontology terms is required. An estimation is made of a steady state labor cost for the functional computation for the percent of schema elements where functional computation is required. An estimation is made of a percent of schema elements in the data sources where structural heterogeneity semantic mapping between schema terms and ontology terms is required. An estimation is made of a steady state labor cost for the semantic mapping for the percent of schema elements where semantic mapping is required.

The present invention also resides in a system, method and program for estimating a cost of integrating heterogeneous data sources. An estimation is made of a percent of schema elements in each data source where functional computation based on semantic mapping between schema terms and ontology terms is required. An estimation is made of a transitional labor cost for implementing a first program to perform the functional computation for the percent of schema elements where functional computation is required. An estimation is made of a percent of schema elements in each data source where structural heterogeneity semantic mapping between schema terms and ontology terms is required. An estimation is made of a transitional labor cost for implementing a second program to perform semantic mapping for the percent of schema elements where semantic mapping is required.

DETAILED DESCRIPTION OF THE PREFERRED EMBODIMENTS

Figure 1:
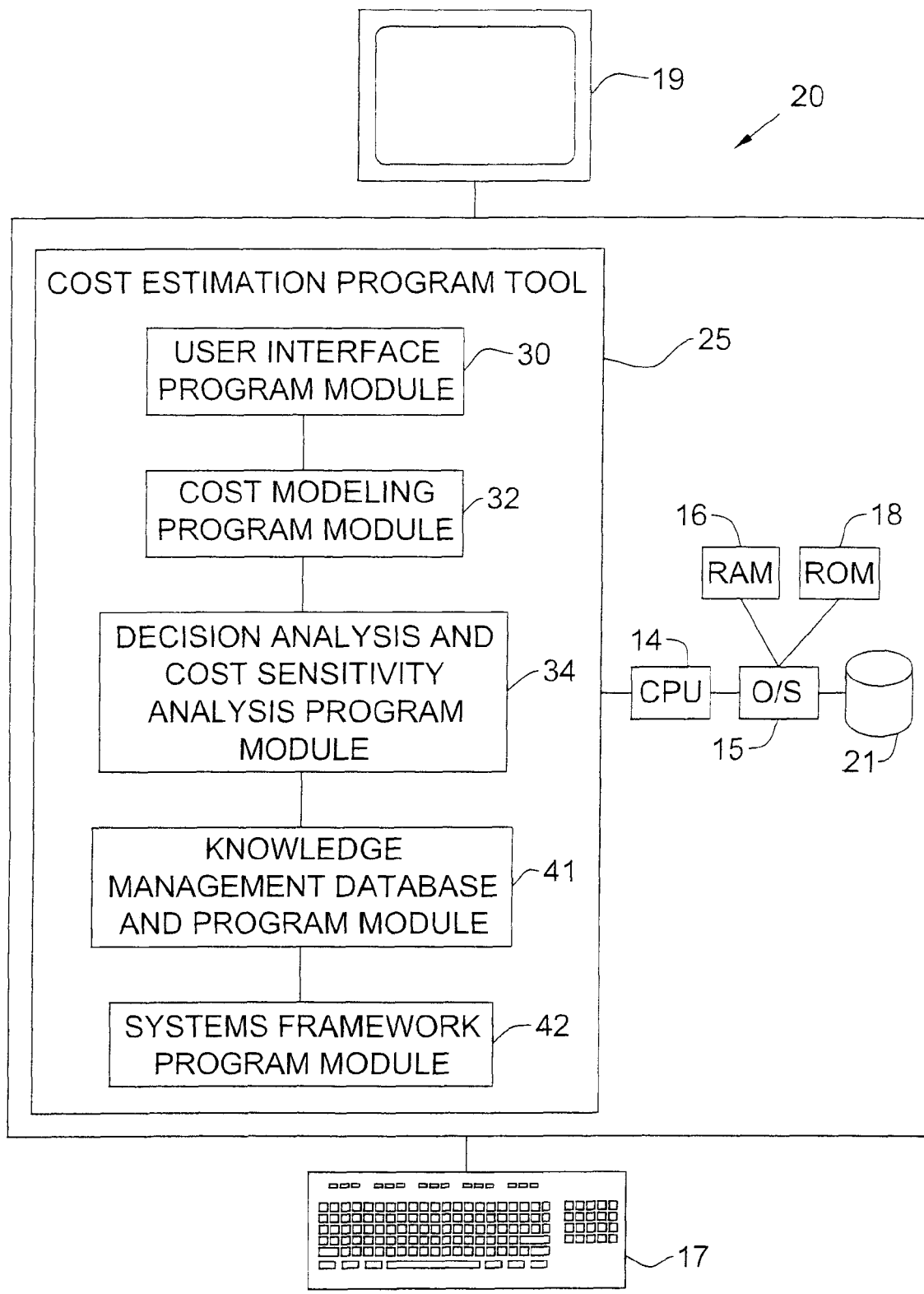
FIG. 1 is a block diagram of a computer system which includes a cost estimation tool according to the present invention.

The present invention will now be described in detail with reference to the figures. FIG. 1 illustrates a computer system 20 which includes the present invention. System 20 includes known CPU 14, operating system 15, RAM 16, ROM 18, keyboard 17, monitor 19 and internal and/or external disk storage 21. System 20 also includes a cost estimation program tool 25 in accordance with the present invention. Program 25 comprises a user interface program module 30, a cost modeling program module 32, a decision analysis and cost sensitivity analysis program module 39, a knowledge management database and program module 41, and a systems framework program module 40. Together they permit estimation of the initial cost of integrating heterogeneous data sources and subsequent use of the heterogeneous data sources. Program 25 is stored on disk storage 21 for execution by CPU 14 via RAM 16.

The user interface program module 30 displays requirements data submitted by the end-user of the heterogeneous data systems. For example, the requirements data comprises a number of databases to be reconciled, schema information for each type of database (for example, relational or object oriented), a number of schema elements in each schema to be considered, business policies to be considered, network environment information, a type of semantic conflict reconciliation method (or methods) to be used, a number of users that will need access to the heterogeneous data system, and a performance requirement for estimating time spent by the system. Program 25 may need input parameters for each semantic reconciliation business variable and technical variable that will have an impact on the cost of the semantic reconciliation of the heterogeneous data sources. For example, location attributes such as street addresses—related semantic conflicts are best resolved by applying a specific semantic reconciliation technique 'J67' along with a more general semantic reconciliation technique 'X45'. Currency attributes such as monetary values—related semantic conflicts are best resolved by applying a specific semantic reconciliation technique 'G21' along with a more general semantic reconciliation technique 'Y54'. Computed functional attributes such as pension, compound interest, etc. are best resolved by applying a specific semantic reconciliation technique 'G12' along with a more general semantic reconciliation technique 'Y55'. Another example is a cost of creating an information wrapper such as one for a relational database with 'N' tables with less than 'n' attributes. An "information wrapper" is a data container which translates unstructured information into structured information. (For example, a database schema is "structured information" and free text is unstructured information.) The information wrapper recognizes certain nouns of unstructured data as corresponding to certain table or entity names of structured data. The user interface program module 30 guides the tool-user in selecting these variables from a predefined set of candidates. Typically, there is more than one viable parameter from which the user can choose. The user interface program module 30 also displays the cost estimates subsequently generated by other program components within tool 25. The user interface program module 30 also guides and allows the user to make changes in requirements data and reconciliation business and technical variables to obtain different cost estimates.

The cost modeling program module 32 calculates labor, hardware, software and infrastructure costs for a given set of end-user provided requirements and end-user's selection of reconciliation business and technical variables that influence the cost of the semantic reconciliation of heterogeneous data sources. The cost modeling program 32 uses facts, business rules and data maintained by the knowledge management database and program 41 in making its cost estimates.

The knowledge management database and program module 41 stores facts, business rules and data pertaining to the following:
(a) Selection of tool-sets/methodologies for creating network and data integration subsystems (such as wrappers, shared vocabulary, etc.) and inter-data source linkages. These are a prerequisite for connectivity between heterogeneous data sources before any semantic reconciliation or meaningful exchange of information between the heterogeneous data sources can occur.
(b) Implementation of tool-sets/methodologies for creating network and data integration subsystems (such as wrappers, shared vocabulary, etc.) and inter-data source linkages. These are a prerequisite for connectivity between heterogeneous data sources before any semantic reconciliation or meaningful exchange of information between the heterogeneous data sources can occur.
(c) Identification and estimation of hardware, software, labor and infrastructure costs required to create the data integration environment for a given set of heterogeneous data sources.
(d) Identification and estimation of hardware, software, labor and infrastructure costs required to extend a data integration environment to a given set of heterogeneous data sources over time as more data sources become part of the integrated environment; these can be expressed as cost per additional component or additional utility model costs.
(e) Life-cycle management support costs for hardware, software, labor and infrastructure required to manage the integrated set of heterogeneous data sources over time.
(f) Selecting specific semantic reconciliation techniques/tool-sets/methodologies for the identification, classification and adequate reconciliation for each set of semantic conflicts.
(g) Implementing and applying specific semantic reconciliation techniques/tool-sets/methodologies for the identification, classification and adequate reconciliation for each set of semantic conflicts.
(h) Implementing and applying selected combination of semantic reconciliation techniques/tool-sets/methodologies for the identification, classification and adequate reconciliation for each set of semantic conflicts.
(i) Estimating costs for implementing and applying specific semantic reconciliations techniques/tool-sets/methodologies for the identification, classification and adequate reconciliation for each set of semantic conflicts.
(j) Estimating costs for implementing and applying selected combination of semantic reconciliation techniques/tool-sets/methodologies for the identification, classification and adequate reconciliation for each set of semantic conflicts.
(k) Historical cost data for implementing semantic reconciliation environments from previous similar operational efforts.

Knowledge engineers provide the foregoing data and rules for the knowledge management data base and program. The knowledge engineers are domain experts in facts, business rules and data pertaining to knowledge domains. The knowledge engineers participate in the initial creation of the knowledge management database and program, and periodically update the knowledge base database and program. The knowledge management database and program module 41 also contains a data processing program engine which performs data management operations on the data stored within the repository.

The decision analysis and cost sensitivity analysis program module 39 processes input variables (such as end-user requirements data and reconciliation business and technical variables selections by the tool-user) based on integration and usage facts and rules maintained by the knowledge management database and program module 41. Then, the module 39 invokes the cost modeling program module 32 to calculate the actual cost for labor, hardware, software and infrastructure. The decision analysis and cost sensitivity program module 39 can also be used to subsequently alter input variables to reduce cost.

The systems framework program module 40 integrates the program modules 30, 32, 39 and 41 to work together. The systems framework program module 40 also provides National Language Support (NLS) for the user. The systems framework program module 40 can be implemented in a variety of programming languages such as JAVA to provide multi-operating system support, multi-hardware support, distributed objects (including database support), and multi-language support. In an alternate embodiment of the present invention, program modules 30, 32, 39 and 41 can reside on different computer systems, in which case the system framework program module 40 can integrate these program modules using a distributed network computing architecture. The system framework program module also provides controlled and secure program interfaces between the program modules 30, 32, 39 and 41 and the external system environment (such as tool-users, end-users and other outside applications) to manage updates, facilitate general systems management tasks (such as program backup and recovery), and support future interactions and integration with other useful programs.

The following is a more detailed description of program modules 30, 32, 39 and 41.

The user interface program module 30 allows a tool-user and end-user to interact with the overall system to specify end-user requirements and select technical and business variables regarding the heterogeneous data systems and their proposed integration and subsequent use. The following is a non-exhaustive list of the end-user requirements and reconciliation business and technical variables, for which the user's input is solicited:

(a) Number of data sources which will participate in the semantic reconciliation/semantic data integration effort.

(b) Approximate number of additional data sources, which may be added annually to the semantically integrated environment.

(c) Identification of applicable knowledge domain(s) (for example, medical, mechanical engineering, finance, material resource planning, enterprise resource planning, or human resources) for each data source.

(d) Identification of attributes (such as total DASD, processor speed, memory, etc.) of each data source's hardware platform.

(e) Identification of attributes (such as vendor, version, patch level, etc.) of each data source's operating system platform.

(f) Identification of attributes (such as vendor, version, patch level, etc.) of each data source's middleware software component.

(g) Identification of attributes (such as vendor, version, patch level, relational/object oriented, centralized/distributed, etc.) of each data source's database management system software.

(h) Identification of attributes (such as vendor, version, patch level, information wrapper enablement capability, etc.) of each data source's application front end software component.

(i) Identification of each data source's supported network protocols.

(j) Identification of each data source's supported network infrastructure including attributes for network topology, network interface cards, etc.

(k) Identification of each data source's location dependencies (and attributes for any distributed data source).

(l) Identification of each data source's NLS requirements.

(m) Identification of each data source's physical implementation (such as number of tables, and growth rate of number of tables) with respect to database schema. (Information about number of rows/table, data growth rate per table, primary indexes, etc. is not required.)

(n) Identification of each data source's physical implementation with respect to all data formats used by the data source. (For example, if Oracle database software is used, tool 25 already knows all date formats, currency formats, number formats, character formats, memo field usage, indexes, data dictionary tables, referential integrity constraints, primary keys, secondary keys, composite keys, Binary Large Object ("BLOB") fields, etc.)

(o) Identification of each data source's physical implementation with respect to capturing business rules governing the data source's operations (for example whether business rules are captured as stored procedures, database triggers or sequences, or captured as part of business logic at the application layer or a combination of all of the above).

(p) Identification of each data source's physical implementation with respect to data dictionary/meta data implementation used within the data source's meta data repository. (For example, if Oracle data base software is used then tool 25 already knows all date formats, currency formats, number formats, character formats, memo field usage, BLOB fields, etc. used by the Oracle software.)

(q) Identification of each data source's physical implementation with respect to all data formats used within the data source's data dictionary/meta data repository.

(r) Identification of each data source's physical implementation with respect to business rules governing the data source's data dictionary/meta data operations.

(s) Identification of attributes of each data source's logical implementation with respect to database schema (for example, relational schema, object oriented schema, file based data structures, etc.).

(t) Identification of attributes of each data source's logical implementation with respect to all data formats used within the data source (for example, relational schema, object oriented schema, file based data structures, etc.).

(u) Identification of attributes of each data source's logical implementation with respect to capturing business rules governing the data source's operations (for example, relational schema, object oriented schema, file based data structures, application level business logic routines, etc.).

(v) Identification of attributes of each data source's logical implementation with respect to data dictionary/meta data implementation (for example, data dictionary/meta data schema).

(w) Identification of preferred tool-sets/methodologies for creating network and data integration subsystems (such as WAN links, LAN links, information wrappers, vocabulary shared by heterogeneous databases, etc.) from amongst a system generated choice list for creating inter-data source linkages. (The shared vocabulary is also called "ontology".)

(x) Identification of preferred tool-sets/methodologies pertaining to extension of data integration environment over time as more data sources become part of the integrated environment.

(y) Identification of preferred and system recommended specific semantic reconciliation techniques/tool-sets/methodologies for the identification, classification and adequate reconciliation for each set of semantic conflicts.

(z) An estimate of the number of queries posed against heterogeneous data sources, which will require semantic reconciliation, within the same knowledge domain.

(aa) An estimate of the number of queries posed against heterogeneous data sources, which will require semantic reconciliation, across different knowledge domains.

(bb) An estimate of the minimum tolerable time period as well as the maximum allowable time period within which the desired semantic reconciliation environment must be implemented.

(cc) An estimate of the minimum time period as well as the maximum allowable time period over which the semantic reconciliation environment will need to be managed.

(dd) Specification of fully burdened labor rates for each skill level required for integration and use of the semantically reconciled heterogeneous data sources.

(ee) Identification of geographic locations where data sources, which will participate in the integrated semantic reconciliation process, are located.

(ff) Identification and selection of preferred types of servers (from a system provided list), with respect to hardware vendor choice, server operating system choice, etc. required to support the desired semantic reconciliation infrastructure environment.

(gg) Identification and selection of hardware configuration, operating system, software applications installed, and network configurations for any server supporting the desired semantic reconciliation infrastructure environment (from a system provided list).

(hh) Identification and selection of network connections details between each location where the heterogeneous data sources are located. (An abstract level network diagram can be generated graphically using the user interface program module 30 based on the user's input.)

(ii) Identification of owner's technology refresh policy (for replacing severs and other hardware) in terms of after how many years a service a piece of hardware such as a server, router, switch, etc. may be retired and replaced by newer equipment).

Once the user has input all end-user requirements and business and technical variables, the user interface program module 30 can be used to request various types of cost estimation proposal reports in various formats including screen based reports, HTML reports, pdf files, text file reports, and CSV files based reports. The reports include various cost accounts broken down by cost categories (hardware, software, labor, etc. for semantic reconciliation). The various types of reports are provided as a result of the inputs fed into program module 30 and the back-end processing performed by program modules 32, 39 and 41. The cost data can also be reported in a granular format with reporting categories.

The knowledge management database and program module 41 stores facts, business rules and data pertaining to semantic reconciliation amongst heterogeneous data sources. The following are key facts, data and business rules which are stored within the knowledge management database and program module 41:

(a) Classification of each possible semantic conflict between data pairs as a combination of the following relationships: synonym, homonym, function, aggregation, generalization, specialization, or unrelated.
(b) Classification of each possible semantic conflict between data pairs from a query and a database, based on structural levels including class, instance, and attribute levels.
(c) Semantic reconciliation technique 'X'15 is suitable to use for data sources belonging to knowledge domains 'A', 'B', . . . 'N'.
(d) Semantic reconciliation technique 'X'17 is suitable to use only for data sources belonging to knowledge domain 'K'.
(e) Semantic reconciliation technique 'Y' utilizes lexicon/ontology/dictionary 'p', and does not work well with lexicon/ontology/dictionary 'f' or 'g'.
(f) Location attributes 'such as street addresses' related semantic conflicts are best resolved by applying a specific semantic reconciliation technique 'J67' along with the more general semantic reconciliation technique 'X45'.
(g) Currency attributes 'such as monetary values' related semantic conflicts are best resolved by applying a specific semantic reconciliation technique 'G21' along with the more general semantic reconciliation technique 'Y54'.
(h) Computed functional attributes 'such as pension, compound interest, etc.' are best resolved by applying a specific semantic reconciliation technique 'G12' along with the more general semantic reconciliation technique 'Y55'.
(i) Cost of creating an information wrapper for a relational database with 'N' tables with less than 'n' attributes is $YRT.
(j) Cost of creating an information wrapper for a semi-structured data source with 'N' information attributes is $JKL per semi-structured page with less than 'm' characters.
(k) Middleware software applications 'TRX', 'LJK' or 'YUT' are preferred to create a data integration software layer between relational databases, with license costs of $X, $Y, and $Z respectively, per data source.
(l) Middleware 'TRX', 'LJK' or 'YUT' are preferred to create data integration software layer between relational databases, with implementation costs of $Xaj, $Yab, and $Zah respectively, per data source.
(m) Middleware 'XRT', 'JKL' or 'TUY' are preferred to create data integration software layer between object oriented databases, with license costs of $A, $B, and $C respectively, per data source.
(n) Middleware 'TRX', 'LJK' or 'YUT' are preferred to create a data integration software layer between object oriented and relational databases, with implementation costs of $Aaj, $Bab, and $Cah, respectively, per data source.
(o) Cost of semantically mapping 'm' attributes from a database schema to a common lexicon/ontology/dictionary is '$DFR' and requires (m*r) hours of medium skilled labor (as identified by the system in labor rates).
(p) Cost of installing and configuring semantic reconciliation technique 'Y575' to semantically integrate 'W' pairs of heterogeneous data sources created using the same DBMS is $VCU.
(q) Cost of installing and configuring semantic reconciliation technique 'X176' for 'N' number of heterogeneous data sources, which include 'n' relational database, 'm' object oriented database, and 'k' semi-structured data sources requiring wrapper generation is '$CXD'.
(r) Cost for managing semantic reconciliation technique 'X'15 for 'n' databases is $TYV/month and $VRE/month, respectively.
(s) Cost of semantically reconciling each local database query composed of 'n' terms against a remote database containing 'm' schema elements and while using semantic reconciliation technique 'Y577' is '$PTX'.
(t) Semantic reconciliation technique 'TUX456RS' can perform semantic reconciliation for US English language databases only.
(u) Cost of manual intervention to resolve a semantic conflict between each local database query term against a remote database containing 'm' schema elements is '$PTPPX'.
(v) Cost of providing a network communication link between 'b' data sources using 'LKJ' network topology and 'RHG' network protocols and 'YR' kb/sec bandwidth is $UQW.
(w) Rules pertaining to cost metrics (including software, hardware, labor and infrastructure costs) for connecting 'n' different and previously unconnected geographic locations where data sources are located is $QQQ.
(x) Rules pertaining to cost metrics (software, hardware, labor and infrastructure costs) for procuring, configuring and installing preferred types of servers (from a system provided list), with respect to hardware vendor choice, server operating system choice, etc. required to support the desired semantic reconciliation infrastructure environment.
(y) Rules pertaining to cost metrics for data source integration and usage based on hardware, software, labor and infrastructure required to manage the integrated set of heterogeneous data sources over time.
(z) Rules pertaining to cost metrics for technology refresh of each type of hardware, which is to be used as part of the infrastructure setup for the semantic reconciliation environment.

After the user enters the end-user requirements and business and technical variables into cost estimation program tool 25 using the user interface program module 30, the user can invoke the decision analysis and cost sensitivity analysis program module 39 to obtain an estimate of the initial integration or "transitional" cost and subsequent use or "steady state" cost. This can be the first cost estimation for the heterogeneous data sources or a subsequent estimation based on sensitivity/"what-if" analysis on a previously generated cost estimate after changing one or more parameters. The decision analysis and cost sensitivity analysis program module 39 first establishes an overall goal and criteria for decision making based on the user's or owner's requirements data. It then creates a decision hierarchy based on all known criteria and identifies the various alternatives based on its interaction with program modules 32 and 41. The decision hierarchy is determined based on parameters and requirements provided by the end user. For example if the user enters a high end budget constraint of $100K, then all hardware, software and semantic integration tasks will be sorted in order to provide an estimate which may not be the best possible solution but which meets the budget goal. The decision analysis and cost sensitivity analysis program module (by invoking the knowledge management database and program module 41 and the cost modeling program module 32 with new sets of parameters for each sub path in the decision hierarchy) determines the costs of all decision sub-paths within each alternative to compute the lowest cost alternative that meets required goals and criteria. The cost modeling program module 32 calculates specific labor, hardware, software and infrastructure costs based on user provided requirements data and facts, data and business rules maintained by the knowledge management database and program module 41. The cost modeling program module 32 then tallies the costs and supplies the total to the decision analysis and cost sensitivity analysis program module 39 which presents them to the user via the user interface. If the user changes the requirements criteria by changing any of the values of earlier provided technical/business variables, the decision analysis and cost sensitivity analysis program module re-computes the cost estimate and provides a new solution to the user.

The cost modeling program module 32 includes functions and formulas to estimate the semantic reconciliation operation's life-cycle management costs, as follows:

Let $f(x)$=upfront setup cost of the semantic reconciliation environment based on a given set of business/technical variables. ($f(x)$ will also be referenced as "transition" costs)

Let $f(y)$=cost of managing the semantic reconciliation operation over time excluding $f(x)$ based on a given set of business/technical variables. ($f(y)$ will also be referenced as "steady state" costs.)

The estimated proposal costs to be incurred by the owner for undertaking the overall semantic reconciliation life cycle management operation are estimated by $f(z)$, where $f(z)=f(x)+f(y)$.

The following is a generalized form of cost modeling performed by the cost modeling program module 32 to calculate both $f(x)$ and $f(y)$ and yield $f(z)$ based on a given set of user input regarding business/technical variables, and the facts/business rules embedded in the knowledge management database. Note that the generalized form of the cost model described below assumes that all requirements data pertaining to required technical and business variables have already been provided by the user or owner and have been stored in the knowledge management database. Also, the cost function calculations are based on historical data, expert knowledge, parametric knowledge, facts and business rules maintained in the knowledge database.

Let DSMgt=Traditional data source management costs during transition.

Let DSMgs=Traditional data source management costs during steady state.

Let Map t=Costs for mapping local data source schema elements from each data source to a shared lexicon/ontology/dictionary during transition.

Let Maps=Costs for mapping local data source schema elements from each data source to a shared lexicon/ontology/dictionary during steady state.

Let InstSemInt t=Cost of configuring and implementing the system selected semantic reconciliation technique(s) across heterogeneous data sources environment during transition.

Let MngSemInt s=Cost of managing and maintaining the system selected semantic reconciliation technique(s) across heterogeneous data sources environment during steady state.

Let QP t=Cost of estimated number of queries, which will require semantic reconciliation and which will be posted against the integrated data sources during transition.

Let QP s=Cost of estimated number of queries, which will require semantic reconciliation and which will be posted against the integrated data sources during steady state.

Let HW t=Hardware costs during transition.

Let HWs=Hardware costs during steady state.

Let Net t=Network services costs during transition.

Let Nets=Network services costs during steady state.

Let SWt=Software costs during transition.

Let SWs=Software costs during steady state

Let Tt=Transition duration.

Let St=Steady State duration.

Then $f(X)$ is a function of the following costs:

$f(x)=f(DSMgt, Map\ t, InstSemInt\ t, HW\ t, QP\ t, Net\ t, SWt, Tt)$.

and $f(y)$ is a function of the following costs:

$f(y)=f(DSMgs, Map\ s, MngSemInt\ s, HWs, QP\ s, Net\ S, SWs, St)$.

The costs, which are components of $f(x)$ and $f(y)$, can be further broken down into the following computed functions:

Let DSn t=number of data sources which will participate in the integrated semantic reconciliation environment during transition.

Let DS(OS)n t=The number of data sources in DSn t categorized per operating system (where the operating system may be Linux RedHat, HP-UX, AIX, Win NT operating system, etc.) during transition.

Let DS (HW)n t=The number of data sources in DSn t categorized per hardware (HW) model (where HW may be IBM x Series, IBM p series, Sun Fire 3800, HP 9000 computer, etc.) during transition.

Let DS(LOGL)n t=The number of data sources in DSn t per logical schema implementation (where LOGL may be relational, object oriented, CODASYL, etc.) during transition.

Let DS(Ven)n t=The number of data sources in DSn t per vendor (where Ven may be MS SQL Server, IBM DB2, Oracle, Informix database, etc.) during transition.

Let DS(Size)n t(1 . . . DSn t)=The size of each data source (1 . . . DSn t) in Giga-bytes during transition.

Let DS(Up)n t(1 . . . DSn t)=The number of DBMS software updates for each data source (1 . . . DSn t) during transition.

Let DS(Vers)n t(1 . . . DSn t)=The number of version upgrades for each data source (1 . . . DSn t) during transition.

Let DS(Rec)n t(1 . . . DSn t)=The transition costs of disaster recovery management system for each data source (1 . . . DSn t).

Let DSn s=The number of data sources including DSn t, which will participate in the integrated semantic reconciliation environment during steady state.

Let DS(OS)n s=The number of data sources in DSn s categorized per operating system (where OS may be Linux RedHat, HP-UX, AIX, Win NT operating system, etc.) during steady state.

Let DS(HW)n s=The number of data sources in DSn s categorized per hardware (HW) model (where HW may be IBM x Series, IBM p series, Sun Fire 3800, HP 9000 computer, etc.) during steady state.

Let DS(LOGL)n s=The number of data sources in DSn s categorized per logical schema implementation (where LOGL may be relational, object oriented, CODASYL, etc.) during steady state.

Let DS(Ven)n s=The number of data sources in DSn s categorized per vendor (where Ven may be MS SQL Server, IBM DB2, Oracle, Informix, etc.) during steady state.

Let DS(Size)n s(1 ... DSn s)=The size of each data source (1 ... DSn s) in Giga Bytes during steady state.
Let DS(Up)n s(1 ... DSn s)=The number of DBMS software updates for each data source (1 ... DSn s) during steady state.
Let DS(Vers)n s(1 ... DSn s)=The number of version upgrades for each data source (1 ... DSn s) during steady state.
Let DS(Rec)n s(1 ... DSn s)=The steady state costs of disaster recovery management system for each data source (1 ... DSn s).
Then DSMgt is a function of the following costs:
DSMgt=f (DSn t, DS(OS)n t, DS(HW)n t, DS(LOGL)n t, DS(Ven)n t, DS(Size)n t(1 ... DSn t), DS(Up)n t(1 ... DSn t),DS(Vers)n t(1 ... DSn t), DS(Rec)n t (1 ... DSn t), Tt).
and DSMgs is a function of the following costs:
DSMgs=f (DSMgt, DSn s, DS(OS)n s, DS(HW)n s, DS(LOGL)n s, DS(Ven)n s, DS(Size)n s(1 ... DSn s), DS(Up)n s(1 ... DSn s), DS(Vers)n s (1 ... DSn s), DS(Rec)n s(1 ... DSn s), St).
Let ElemSct(k)=The number of schema elements in each data source 'k' (where k ranges from 1 ... DSn t) during transition.
Let Ont t (k)=The transition labor cost for implementing the selected shared lexicon/ontology/dictionary for each data source 'k' (where k ranges from 1 ... DSn t).
Let Autot(k)=The transition labor cost for the % of schema elements in each data source 'k' (where k ranges from 1 ... DSn t) which are automatically mapped to correct ontology terms.
Let Mant(k)=The transition labor cost for the % of schema elements in each data source 'k' (where k ranges from 1 ... DSn t) which are manually mapped to correct ontology terms.
Let Valdt(k)=The transition labor cost for the % of schema elements in each data source 'k' (where k ranges from 1 ... DSn t) where validation of accurate semantic mappings between schema terms and ontology terms is required.
Let Compt(k)=The transition labor cost for the % of schema elements in each data source 'k' (where k ranges from 1 ... DSn t) where functional computation based semantic mapping between schema terms and ontology terms is required.
Let Structt(k)=The transition labor cost for the % of schema elements in each data source 'k' (where k ranges from 1 ... DSn t) where structural heterogeneity semantic mapping between schema terms and ontology terms is required.
Let ElemScs(k)=The number of schema elements in each data source 'k' (where k ranges from 1 ... DSn s) during steady state.
Let Ont s (k)=The steady state labor cost for implementing the selected shared lexicon/ontology/dictionary for each data source 'k' (where k ranges from 1 ... DSn s).
Let Autos(k)=The steady state labor cost for the % of schema elements in each data source 'k' (where k ranges from 1 ... DSn s) which are automatically mapped to correct ontology terms.
Let Mans(k)=The steady state labor cost for the % of schema elements in each data source 'k' (where k ranges from 1 ... DSn s) which are manually mapped to correct ontology terms.
Let Valds(k)=The steady state labor cost for the % of schema elements in each data source 'k' (where k ranges from 1 ... DSn s) where validation of accurate semantic mappings between schema terms and ontology terms is required.
Let Comps(k)=The steady state labor cost for the % of schema elements in each data source 'k' (where k ranges from 1 ... DSn s) where functional computation based semantic mapping between schema terms and ontology terms is required.
Let Structs(k)=The steady state labor cost for the % of schema elements in each data source 'k' (where k ranges from 1 ... DSn s) where structural heterogeneity semantic mapping between schema terms and ontology terms is required.
Then Map t is a function of the following costs:
Map t=f (DSn t,ElemSct(k),Ont t (k),Autot(k), Mant(k),Valdt (k), Compt(k), Structt(k),Tt).
and Map s is a function of the following costs:
Map s=f (Map t, DSn s,ElemScs(k), Ont s (k), Autos(k), Mans(k), Valds(k), Comps(k), Structs(k),St).
Let SemConf(x) t=Transition cost of implementing the semantic conflict identification technique 'x' for identifying semantic conflicts between a cross data source query and the schema elements in data source 'k' (where k ranges from 1 ... DSn t), and where x has been selected for k by system 20 as one of the applicable techniques.
Let SemClass(y) t=Transition cost of implementing the semantic conflict classification technique 'y' for classifying semantic conflicts between a cross data source query and schema elements in data source 'k' (where k ranges from 1 ... DSn t), and where y has been selected for k by system 20 as one of the applicable techniques.
Let SemRec(z) t=Transition cost of implementing the semantic conflict reconciliation technique 'z' for reconciling semantic conflicts between a cross data source query and schema elements in data source 'k' (where k ranges from 1 ... DSn t) and where z has been selected for k by system 20 as one of the applicable techniques.
Let CombSem(x,y,z) t=Transition costs for application integration required for installation of combination of all system selected semantic conflict identification, semantic conflict classification, and semantic conflict reconciliation methods selected for a data source 'k' where x, y and z have been selected for k by system 20 as the combined applicable techniques.
Let NonMont(x,y,z) t=Transition costs for implementing a non-monotonic semantic assertion belief maintenance system for supporting the query context generated by the combination of all system selected semantic conflict identification, semantic conflict classification, and semantic conflict reconciliation methods selected for a data source 'k'. A "non-monotonic semantic assertion belief maintenance system" means a system which makes initial assumptions as to correlations between table names in heterogeneous data bases, but can later recognize that those assumptions were incorrect, and back track to make other assumptions. For example, if one table uses a term "bridge" in one database and another table uses the same term "bridge in another database, the system may initially assume that the bridge data in both databases refers to a similar attribute. However, if the system later determines, based on vastly different data or knowledge, that the terms mean something different, for example a highway bridge versus a dental bridge, then the system can undo the correlations that were previously made based on the incorrect assumption, and then proceed with a different assumption.
Let Wrap(k)t=Transition costs for implementing a wrapper to convert semi-structured data from a semi structured data source 'k' (where k ranges from 1 ... DSn t) to a structured schema, which can interface with semantic reconciliation techniques.
Let SemConf(x) s=Steady state cost of managing and maintaining the semantic conflict identification technique 'x' for identifying semantic conflicts between a cross data source query and the schema elements in data source 'k' (where k ranges from 1 ... DSn s), and where x has been selected for k by program module 32 as one of the applicable techniques.
Let SemClass(y) s=Steady state cost of managing and maintaining the semantic conflict classification technique 'y' for classifying semantic conflicts between a cross data source query and schema elements in data source 'k' (where k ranges from 1 . . . DSn s), and where y has been selected for k by program module 32 as one of the applicable techniques.

Let SemRec(z) s=Steady state cost of managing and maintaining the semantic conflict reconciliation technique 'z' for reconciling semantic conflicts between a cross data source query and schema elements in data source 'k' (where k ranges from 1 . . . DSn s) and where z has been selected for k by program module 32 as one of the applicable techniques.

Let CombSem(x,y,z) s=Steady state costs for management and maintenance of the combination of all system selected semantic conflict identification, semantic conflict classification, and semantic conflict reconciliation methods selected for a data source 'k' where x, y and z have been selected for k by program module 32 as the combined applicable techniques.

Let NonMont(x,y,z) s=Steady state costs for the management and maintenance of the non-monotonic semantic assertion belief maintenance system for supporting the query context generated by the combination of all system selected semantic conflict identification, semantic conflict classification, and semantic conflict reconciliation methods selected for a data source 'k'.

Let Wrap(k)s=Steady state costs for management and maintenance of the wrapper to convert semi-structured data from a semi structured data source 'k' (where k ranges from 1 . . . DSn s) to a structured schema, which can interface with semantic reconciliation techniques.

Then InstSemInt t is a function of the following costs:
InstSemInt t=f (DSn t,SemConf(x) t,SemClass(y) t, SemRec (z) t,CombSem(x,y,z) t,NonMont(x,y,z) t,Wrap(k)t,Tt)
and MngSemInt s is a function of the following costs:
MngSemInt s=f (InstSemInt,DSn s,SemConf(x) s,SemClass (y) s,SemRec(z) s, CombSem(x,y,z) s,NonMont(x,y,z) s, Wrap(k)s, St).

Let Qn t=An estimated total number of cross data source queries to be posed against the integrated system during transition.

Let QnOO t=An estimated number of object oriented cross data source queries to be posed against the integrated system during transition.

Let QnR t=An estimated number of relational cross data source queries to be posed against the integrated system during transition.

Let QTnt=An estimated number of cross data source queries, which must be translated to a canonical data model form in order to be processed against the integrated system during transition.

Let QTnCt=Transition costs of transforming cross data source queries to a canonical data model form. A "canonical" data model form means a common data model.

Let QMn t=An estimated total number of cross data source queries to be posed against the integrated system which will be flagged by program module 32 as requiring manual intervention for validation of reconciled semantic conflicts during transition.

Let QMnC t=Transition costs for reconciling the cross data source queries, which will be flagged by program module 32 as requiring manual intervention for validation of reconciled semantic conflicts during transition.

Let Qn s=An estimated total number of cross data source queries to be posed against the integrated system during steady state.

Let QnOO s=An estimated number of Object Oriented cross data source queries to be posed against the integrated system during steady state.

Let QnR s=An estimated number of Relational cross data source queries to be posed against the integrated system during steady state.

Let QTns=An estimated number of cross data source queries, which must be translated to a canonical data model form in order to be processed against the integrated system during steady state.

Let QTnCs=Steady state costs of transforming cross data source queries to a canonical data model form.

Let QMn s=An estimated total number of cross data source queries to be posed against the integrated system which will be flagged by program module 32 as requiring manual intervention for validation of reconciled semantic conflicts during steady state.

Let QMnC s=Steady state costs for reconciling the cross data source queries, which will be flagged by program module 32 as requiring manual intervention for validation of reconciled semantic conflicts during steady state.

Then QP t is a function of the following costs:
QP t=f (DSn t,Qn t,QnOO t, QnR t, QTnt,QTnCt, QMn t, QMnC t,Tt)
and QP s is a function of the following costs:
QP s=f (QP t, DSn s,Qn s,QnOO s, QnR s, QTns,QTnCs, QMn s, QMnC s,St).

Let NetHW t=number of network switches, hubs, routers, gateways required during transition for production environment.

Let NetHW s=number of network switches, hubs, routers, gateways required during steady state for production environment.

Let Serv t=number of servers required during transition for semantic reconciliation infrastructure production environment.

Let Serv t-lab=number of servers required during transition for semantic reconciliation lab infrastructure environment.

Let Serv s=number of servers required during steady state for semantic reconciliation infrastructure production environment.

Let Serv s-lab=number of servers required during steady state for semantic reconciliation lab infrastructure environment.

Let Wkst t=number of workstations required during transition for production environment.

Let Wkst t-lab=number of workstations required during transition for semantic reconciliation lab environment.

Let Wkst s=number of workstations required during steady state for production environment.

Let Wkst s-lab=number of workstations required during steady state for semantic reconciliation laboratory environment.

Let Med t=cost of media, such as CDs, DVDs, USB devices etc. required during transition for semantic reconciliation environment.

Let Med s=cost of media, such as CDs, DVDs, USB devices etc. required during steady state for semantic reconciliation environment.

Let Per t=cost of peripherals, such as printers, cables, toner cartridges, etc. during transition for semantic reconciliation environment.

Let Per s=cost of peripherals, such as printers, cables, toner cartridges, etc. during transition for semantic reconciliation environment.

Let TRef t=cost of refreshing the required number of servers during the transition period.

Let TRef s=cost of refreshing the required number of servers during the steady state period.

Then HW t is a function of the following costs:
HW t=f (NetHW t, Serv t, Let Serv t-lab, Wkst t, Wkst t-lab, Med t, Per t, TRef t,Tt)
and HW s is a function of the following costs:
HW s=f (NetHW s, Serv s, Let Serv s-lab, Wkst s, Wkst s-lab, Med s, Per s, TRef s,St).
Let NetHWServ t=services labor costs/month for supporting NetHWt during transition.
Let NetHWServ s=services labor costs/month for supporting NetHWs during steady state.
Then Net t is a function of the following costs:
Net t=f (NetHW t, NetHWServ t,DSn t, Tt)
and Net s is a function of the following costs:
Net s=f Net t, NetHW s, NetHWServ s,DSn s, St)
Let LicsDBMS(k) t=cost of acquiring DBMS licenses for data source 'k' (where k ranges from 1 ... DSn t) and for Serv t-lab during transition.
Let LicsOnt(k) t=cost of acquiring shared ontology/lexicon/dictionary licenses for data source 'k' (where k ranges from 1 ... DSn t) and for Serv t-lab during transition.
Let LicsMDW(k) t=cost of acquiring system selected middleware product's licenses for data source 'k' (where k ranges from 1 ... DSn t) and for Serv t-lab during transition.
Let LicsSemInt(k) t=cost of acquiring system selected semantic reconciliation tools/techniques/methodologies licenses for data source 'k' (where k ranges from 1 ... DSn t) and for Serv t-lab during transition.
Let LicsSemQ(k) t=cost of acquiring system selected query transformation and semantic query processing product licenses for data source 'k' (where k ranges from 1 ... DSn t) and for Serv t-lab during transition.
Let LicsNetSoft(k) t=cost of acquiring system selected network management product's licenses for data source 'k' (where k ranges from 1 ... DSn t) and for Serv t-lab during transition.
Let LicsWkst t=cost of acquiring system selected client side licenses for all workstations (Wkst t and Wkst t-lab) during transition.
Let LicsServ t-lab=cost of acquiring system selected operating system licenses for Serv t-lab during transition.
Let LicsServ t=cost of acquiring system selected operating system licenses for data source 'k' (where k ranges from 1 ... DSn t) during transition.
Let LicsDBMS(k) s=cost of maintaining DBMS licenses for data source 'k' (where k ranges from 1 ... DSn s) and for Serv s-lab during steady state.
Let LicsOnt(k) s=cost of maintaining shared ontology/lexicon/dictionary licenses for data source 'k' (where k ranges from 1 ... DSn s) and for Serv s-lab during steady state.
Let LicsMDW(k) s=cost of maintaining system selected middleware product's licenses for data source 'k' (where k ranges from 1 ... DSn s) and for Serv s-lab during steady state.
Let LicsSemInt(k)s=cost of maintaining system selected semantic reconciliation tools/techniques/methodologies licenses for data source 'k' (where k ranges from 1 ... DSn s) and for Serv s-lab during steady state.
Let LicsSemQ(k) s=cost of maintaining system selected query transformation and semantic query processing product licenses for data source 'k' (where k ranges from 1 ... DSn s) and for Serv s-lab during steady state.
Let LicsNetSoft(k) s=cost of maintaining system selected network management product's licenses for data source 'k' (where k ranges from 1 ... DSn s) and for Serv s-lab during steady state.
Let LicsWkst s=cost of maintaining system selected client side licenses for all workstations (Wkst s and Wkst s-lab) during steady state.
Let LicsServ s-lab=cost of maintaining system selected operating system licenses for Serv s-lab during steady state.
Let LicsServ s=cost of maintaining system selected operating system licenses for data source 'k' (where k ranges from 1 ... DSn s) during steady state.
Then SWt is a function of the following costs:
SWt=f (DSn t, LicsDBMS(k) t, LicsOnt(k) t, LicsMDW(k) t,LicsSemInt(k) t,LicsSemQ(k) t,LicsNetSoft(k) t,LicsWkst t,LicsServ t-lab, LicsServ t Tt)
and SWs is a function of the following costs:
SWs=f (SWt, DSn s,LicsDBMS(k)s,LicsOnt(k)s, LicsMDW (k) s,LicsSemInt(k) s,LicsSemQ(k) s,LicsNetSoft(k) s,LicsWkst s,LicsServ s-lab, LicsServ s, St).

The program modules 30, 32, 34, 41 and 42 can be loaded into a computer for execution from a computer storage media such as magnetic tape or disk, optical disk, DVD, etc. or downloaded from the Internet via a TCP/IP adapter card.

Based on the foregoing, a system, method and program product for estimating the cost of reconciling heterogeneous data sources have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for estimating a labor cost to reconcile semantic conflicts between data schema terms used in different data sources, the method comprising the steps of:

a computer estimating a labor cost for mapping, to shared ontology terms, respective pairs of the data schema terms having semantic conflicts with each other, the computer system estimating the labor cost based on at least five of the following: (a) a number of the data sources that contain the data schema terms having the semantic conflicts, (b) an approximate number of the data schema terms in each of the data sources, (c) an approximate labor cost for implementing the shared ontology terms for each of the data sources, (d) an approximate labor cost to manually map to the shared ontology terms a percent of the data schema terms in each of the data sources, (e) an approximate labor cost to validate a percent of the mappings from the data schema terms to the shared ontology terms, (f) an approximate labor cost to perform functional computation for a percent of the mappings from the data schema terms to the shared ontology terms, and (g) an approximate labor cost to perform structural heterogeneity semantic mapping between a percent of the data schema terms and the shared ontology terms; and the computer displaying on a monitor the estimated labor cost for the mapping, to the shared ontology terms, the data schema terms having semantic conflicts with each other.

2. The method of claim 1 wherein the computer estimates the labor cost for the mapping, to the shared ontology terms, the data schema terms having semantic conflicts with each other, based on at least six of the following: (a) the number of the data sources that contain the data schema terms having the semantic conflicts, (b) the approximate number of the data schema terms in each of the data sources, (c) the approximate labor cost for implementing the shared ontology terms for each of the data sources, (d) the approximate labor cost to manually map to the shared ontology terms a percent of the data schema terms in each of the data sources, (e) the approximate labor cost to validate a percent of the mappings from the data schema terms to the shared ontology terms, (f) the approximate labor cost to perform functional computation for a percent of the mappings from the data schema terms to the shared ontology terms, and (g) the approximate labor cost to perform structural heterogeneity semantic mapping between a percent of the data schema terms and the shared ontology terms.

3. The method of claim 1 wherein the computer estimates the labor cost for the mapping, to the shared ontology terms, the data schema terms having semantic conflicts with each other, based on all of the following: (a) the number of the data sources that contain the data schema terms having the semantic conflicts, (b) the approximate number of the data schema terms in each of the data sources, (c) the approximate labor cost for implementing the shared ontology terms for each of the data sources, (d) the approximate labor cost to manually map to the shared ontology terms a percent of the data schema terms in each of the data sources, (e) the approximate labor cost to validate a percent of the mappings from the data schema terms to the shared ontology terms, (f) the approximate labor cost to perform functional computation for a percent of the mappings from the data schema terms to the shared ontology terms, and (g) the approximate labor cost to perform structural heterogeneity semantic mapping between a percent of the data schema terms and the shared ontology terms.

4. The method of claim 1 further comprising the step of:
the computer estimating a labor cost to identify mistakes in the mappings from a plurality of pairs of the data schema terms to a respective plurality of the shared ontology terms, based on differences in human language text associated with the data schema terms in each of the pairs, and determine correct mappings of the data schema terms in each of the pairs to shared ontology terms.

5. The method of claim 1 further comprising the step of:
the computer estimating a labor cost to create an information wrapper to map terms in unstructured text to structured terms in a table-structured database.

6. A computer system for estimating a labor cost to reconcile semantic conflicts between data schema terms used in different data sources, the computer system comprising:
a CPU, a computer readable memory and a computer readable storage media;
first program instructions to estimate a labor cost for mapping, to shared ontology terms, respective pairs of the data schema terms having semantic conflicts with each other, the first program instructions estimating the labor cost based on at least five of the following: (a) a number of the data sources that contain the data schema terms having the semantic conflicts, (b) an approximate number of the data schema terms in each of the data sources, (c) an approximate labor cost for implementing the shared ontology terms for each of the data sources, (d) an approximate labor cost to manually map to the shared ontology terms a percent of the data schema terms in each of the data sources, (e) an approximate labor cost to validate a percent of the mappings from the data schema terms to the shared ontology terms, (f) an approximate labor cost to perform functional computation for a percent of the mappings from the data schema terms to the shared ontology terms, and (g) an approximate labor cost to perform structural heterogeneity semantic mapping between a percent of the data schema terms and the shared ontology terms; and second program instructions to initiate display on a monitor the estimated labor cost for the mapping, to the shared ontology terms, the data schema terms having semantic conflicts with each other; and wherein
the first and second program instructions are stored on the computer readable storage media for execution by the CPU via the computer readable memory.

7. The computer system of claim 6 wherein the first program instructions estimate the labor cost for the mapping, to the shared ontology terms, the data schema terms having semantic conflicts with each other, based on at least six of the following: (a) the number of the data sources that contain the data schema terms having the semantic conflicts, (b) the approximate number of the data schema terms in each of the data sources, (c) the approximate labor cost for implementing the shared ontology terms for each of the data sources, (d) the approximate labor cost to manually map to the shared ontology terms a percent of the data schema terms in each of the data sources, (e) the approximate labor cost to validate a percent of the mappings from the data schema terms to the shared ontology terms, (f) the approximate labor cost to perform functional computation for a percent of the mappings from the data schema terms to the shared ontology terms, and (g) the approximate labor cost to perform structural heterogeneity semantic mapping between a percent of the data schema terms and the shared ontology terms.

8. The computer system of claim 6 wherein the first program instructions estimate the labor cost for the mapping, to the shared ontology terms, the data schema terms having semantic conflicts with each other, based on all of the following: (a) the number of the data sources that contain the data schema terms having the semantic conflicts, (b) the approximate number of the data schema terms in each of the data sources, (c) the approximate labor cost for implementing the shared ontology terms for each of the data sources, (d) the approximate labor cost to manually map to the shared ontology terms a percent of the data schema terms in each of the data sources, (e) the approximate labor cost to validate a percent of the mappings from the data schema terms to the shared ontology terms, (f) the approximate labor cost to perform functional computation for a percent of the mappings from the data schema terms to the shared ontology terms, and (g) the approximate labor cost to perform structural heterogeneity semantic mapping between a percent of the data schema terms and the shared ontology terms.

9. The computer system of claim 6 further comprising:
third first program instructions to estimate a labor cost to identify mistakes in the mappings from a plurality of pairs of the data schema terms to a respective plurality of the shared ontology terms, based on differences in human language text associated with the data schema terms in each of the pairs, and determine correct mappings of the data schema terms in each of the pairs to shared ontology terms; and wherein
the second program instructions initiate display on the monitor of the estimated labor cost to identify and correct mistakes in the mappings; and
the third program instructions are stored on the computer readable storage media for execution by the CPU via the computer readable memory.

10. The computer system of claim 6 further comprising:
third program instructions to estimate a labor cost to create an information wrapper to map terms in unstructured text to structured terms in a table-structured database; and the second program instructions initiate display on the monitor of the estimated labor cost to create the information wrapper; and the third program instructions are stored on the computer readable storage media for execution by the CPU via the computer readable memory.

11. A computer program product for estimating a labor cost to reconcile semantic conflicts between data schema terms used in different data sources, the computer program product comprising:

a computer readable storage media;

first program instructions to estimate a labor cost for mapping, to shared ontology terms, respective pairs of the data schema terms having semantic conflicts with each other, the first program instructions estimating the labor cost based on at least five of the following: (a) a number of the data sources that contain the data schema terms having the semantic conflicts, (b) an approximate number of the data schema terms in each of the data sources, (c) an approximate labor cost for implementing the shared ontology terms for each of the data sources, (d) an approximate labor cost to manually map to the shared ontology terms a percent of the data schema terms in each of the data sources, (e) an approximate labor cost to validate a percent of the mappings from the data schema terms to the shared ontology terms, (f) an approximate labor cost to perform functional computation for a percent of the mappings from the data schema terms to the shared ontology terms, and (g) an approximate labor cost to perform structural heterogeneity semantic mapping between a percent of the data schema terms and the shared ontology terms; and second program instructions to initiate display on a monitor the estimated labor cost for the mapping, to the shared ontology terms, the data schema terms having semantic conflicts with each other; and wherein the first and second program instructions are stored on the computer readable storage media.

12. The computer program product of claim 11 wherein the first program instructions estimate the labor cost for the mapping, to the shared ontology terms, the data schema terms having semantic conflicts with each other, based on at least six of the following: (a) the number of the data sources that contain the data schema terms having the semantic conflicts, (b) the approximate number of the data schema terms in each of the data sources, (c) the approximate labor cost for implementing the shared ontology terms for each of the data sources, (d) the approximate labor cost to manually map to the shared ontology terms a percent of the data schema terms in each of the data sources, (e) the approximate labor cost to validate a percent of the mappings from the data schema terms to the shared ontology terms, (f) the approximate labor cost to perform functional computation for a percent of the mappings from the data schema terms to the shared ontology terms, and (g) the approximate labor cost to perform structural heterogeneity semantic mapping between a percent of the data schema terms and the shared ontology terms.

13. The computer program product of claim 11 wherein the first program instructions estimate the labor cost for the mapping, to the shared ontology terms, the data schema terms having semantic conflicts with each other, based on all of the following: (a) the number of the data sources that contain the data schema terms having the semantic conflicts, (b) the approximate number of the data schema terms in each of the data sources, (c) the approximate labor cost for implementing the shared ontology terms for each of the data sources, (d) the approximate labor cost to manually map to the shared ontology terms a percent of the data schema terms in each of the data sources, (e) the approximate labor cost to validate a percent of the mappings from the data schema terms to the shared ontology terms, (f) the approximate labor cost to perform functional computation for a percent of the mappings from the data schema terms to the shared ontology terms, and (g) the approximate labor cost to perform structural heterogeneity semantic mapping between a percent of the data schema terms and the shared ontology terms.

14. The computer program product of claim 11 further comprising:

third first program instructions to estimate a labor cost to identify mistakes in the mappings from a plurality of pairs of the data schema terms to a respective plurality of the shared ontology terms, based on differences in human language text associated with the data schema terms in each of the pairs, and determine correct mappings of the data schema terms in each of the pairs to shared ontology terms; and wherein the second program instructions initiate display on the monitor of the estimated labor cost to identify and correct mistakes in the mappings; and the third program instructions are stored on the computer readable storage media.

15. The computer program product of claim 11 further comprising:

third program instructions to estimate a labor cost to create an information wrapper to map terms in unstructured text to structured terms in a table-structured database; and the second program instructions initiate display on the monitor of the estimated labor cost to create the information wrapper; and the third program instructions are stored on the computer readable storage media.

* * * * *